United States Patent
Higuchi et al.

(10) Patent No.: US 8,093,514 B2
(45) Date of Patent: Jan. 10, 2012

(54) MIXING-WEIGHING COMBINATION WEIGHER USING AN ALL-KIND COMBINATION PROCESS

(75) Inventors: Hiroshi Higuchi, Takasago (JP); Taketoshi Okamura, Ashiya (JP)

(73) Assignee: Yamato Scale Co., Ltd., Akashi-shi (JP)

( * ) Notice: Subject to any disclaimer, the term of this patent is extended or adjusted under 35 U.S.C. 154(b) by 542 days.

(21) Appl. No.: 11/912,073

(22) PCT Filed: Apr. 4, 2006

(86) PCT No.: PCT/JP2006/307098
§ 371 (c)(1),
(2), (4) Date: Jan. 20, 2009

(87) PCT Pub. No.: WO2006/114992
PCT Pub. Date: Nov. 2, 2006

(65) Prior Publication Data
US 2009/0200087 A1 Aug. 13, 2009

(30) Foreign Application Priority Data
Apr. 19, 2005 (JP) .............................. 2005-121050

(51) Int. Cl.
*G01G 19/387* (2006.01)
(52) U.S. Cl. .................................. 177/25.18
(58) Field of Classification Search ............... 177/25.18
See application file for complete search history.

(56) References Cited

U.S. PATENT DOCUMENTS
4,549,617 A 10/1985 Matsumoto et al.
4,678,046 A * 7/1987 Mosher .............................. 177/1
4,844,190 A 7/1989 Mikami et al.
(Continued)

FOREIGN PATENT DOCUMENTS
JP 58-061416 A * 4/1983
(Continued)

OTHER PUBLICATIONS
International Search Report for PCT/JP2006/307098, dated May 26, 2006.
(Continued)

*Primary Examiner* — Randy W Gibson
(74) *Attorney, Agent, or Firm* — Marshall, Gerstein & Borun LLP

(57) ABSTRACT

A mixing-weighing combination weigher of the present invention comprises a plurality of kind-based groups (G1-G8) each of which is made up of a plurality of combination hoppers (4, 5) fed with objects to be weighed, the kind-based groups being fed with different kinds of objects to be weighed; and a control means (11); and the control means (11) is configured to carry out a process in which combination calculation is performed to find combination weight values for each of the kind-based groups, and combination weight values of a selection number predetermined for each kind are selected from the combination weight values based on a predetermined kind-based combination selection condition; a process in which combination calculation is performed in such a manner that one combination weight value is selected for each kind from the combination weight values selected in this process and selected combination weight values are combined to find one all-kind combination total value within an allowable range; and a discharge process for discharging the objects to be weighed from the combination hoppers (4, 5) corresponding to that all-kind combination total value.

22 Claims, 7 Drawing Sheets

U.S. PATENT DOCUMENTS

| | | | |
|---|---|---|---|
| 6,268,571 B1 * | 7/2001 | Benyukhis | 177/25.18 |
| 6,797,055 B2 * | 9/2004 | Yonetsu | 177/25.18 |
| 2008/0283307 A1 * | 11/2008 | Kawanishi | 177/25.18 |
| 2009/0152019 A1 * | 6/2009 | Higuchi et al. | 177/25.18 |
| 2010/0224421 A1 * | 9/2010 | Kawanishi | 177/25.18 |

FOREIGN PATENT DOCUMENTS

| | | | |
|---|---|---|---|
| JP | 58-108412 A | * | 6/1983 |
| JP | 59-092316 A | * | 5/1984 |
| JP | 63-206619 | | 8/1988 |
| JP | 06-056313 A | * | 3/1994 |
| JP | 07-198466 | | 8/1995 |
| JP | 07-198466 A | * | 8/1995 |
| JP | 2009-103491 A | * | 5/2009 |

OTHER PUBLICATIONS

Extended European Search Report for European Patent Application No. 06731046.6, dated Jun. 29, 2011.

* cited by examiner

MIXING-WEIGHING COMBINATION WEIGHER USING AN ALL-KIND COMBINATION PROCESS

TECHNICAL FIELD

The present invention relates to a mixing-weighing combination weigher which mixes plural different kinds of objects to be weighed and weighs the mixed objects to be weighed so that a weight of the mixed objects to be weighed falls within an allowable range, i.e., performs mixing and weighing.

BACKGROUND ART

There are three methods (sequential compensation method, collective compensation method, and best-subset selection method) to perform mixing and weighing of plural kinds, for example, first to N-th kinds of objects to be weighed, in a conventional mixing-weighing combination weigher. In these methods, predetermined are a target weight value for each kind (kind-based target weight value) and an allowable range for each kind (allowable kind-based range) for each of the first to N-th kind of objects to be weighed, and a total target weight value (target combination weight value) of all kinds and a total allowable range (allowable combination range) of all kinds. The kind-based target weight value for each kind is predetermined so that the total target weight value of all kinds becomes equal to the target combination weight value.

In the sequential compensation method, first, for the first kind, a combination weight value that is closest to a kind-based target weight value of the first kind is found. A kind-based target weight value of the second kind is compensated so as to compensate a difference between that combination weight value and the kind-based target weight value of the first kind. For the second kind, a combination weight value that is closest to the compensated kind-based target weight value of the second kind is found. This calculation is repeated to find combination weight values for respective of all kinds.

In the collective compensation method, for first kind to (N−1)-th kind, combination weight values that are closest to respective kind-based target weight values are found, and a kind-based target weight value of the N-th kind is compensated to compensate a difference between a total of the combination weight values found for the first kind to the (N−1)-th kind and a total of the kind-based target weight values of the first kind to the (N−1)-th kind. For the N-th kind, a combination weight value that is closest to the compensated kind-based target weight value of the N-th kind is found.

In the best-subset selection method, for each of the first kind to the N-th kind, combination weight values in the allowable kind-based range are all found, and are selected as combination candidates. For each of the first kind to the N-th kind, one of the combination weight values selected as the combination candidates is selected, and the selected combination weight values are combined to form combinations, and a combination in which a total of the combined combination weight values falls within an allowable combination range and is closest to the target combination weight value is found (see, for example, Patent Document 1).

Patent Document 1: Japanese Laid-Open Patent Application Publication No. Hei. 7-198466
Patent document 2: Japanese Examined Patent Application Publication No. Hei. 6-56313

DISCLOSURE OF THE INVENTION

Problems to be Solved by the Invention

It is well known that the number of combinations increases and combination precision (weighing precision) improves as the number of hoppers (the number of measured values used in combination calculation) that participate in combinations increases.

In the conventional mixing-weighing combination weigher using the sequential compensation method or the collective compensation method, combination precision of a total of all kinds depends on the number of measured values (the number of hoppers accommodating the objects to be weighed that participate in the combinations) that can participate in the combinations for finding the combination weight value of the last N-th kind. In order to achieve high combination precision, it is necessary to increase the number of hoppers that accommodate the objects to be weighed of the N-th kind. This increases the total number of hoppers, and hence makes the entire combination weigher large-sized. In addition, since the combination weight value of the N-th kind is found after the combination weight values of the first kind to the (N−1)-th kind have been determined, compensation amount of the kind-based target weight value of the last N-kind tends to in some cases become large. In this case, since the objects to be weighed of the amount according to an uncompensated kind-based target weight value are fed to the hoppers which accommodate the objects to be weighed of the N-th kind, a difference between the found combination weight value of the N-th kind and the compensated kind-based target weight value of the N-th kind becomes large, significantly degrading the total combination precision of all kinds. Furthermore, the combination weight value of the N-th kind does not fall within the allowable kind-based range of the N-th kind, causing a failure in the combination.

In the mixing-weighing combination weigher using the best-subset selection method, the total combination precision of all kinds is high. However, since combination weight values (kind-based combination weight values) in the allowable kind-based range of each kind are selected as combination candidates, and these combination candidates are combined to find a total combination weight value of all kinds (all-kind combination total value), the number of combinations for finding the all-kind combination total value becomes large, and hence calculation time increases. In this case, as the number of kinds increases, and the respective allowable kind-based ranges are set larger, the number of combinations for finding a total combination weight value of all kinds increases and enormous amount of calculation time is required, which is not suitable for practical use. For example, consider a combination weigher including sixteen weighing hoppers and sixteen memory hoppers which is generally used for mixing and weighing. Assuming that mixing and weighing of eight kinds is carried out using two weighing hoppers and two memory hoppers for each kind, and the allowable kind-based ranges of respective kinds are set larger (here, the allowable kind-based ranges are not set) in such a combination weigher. In this case, the number of measured values for each kind is four, and the number of combinations is $(2^4-1)=15$. To find an all-kind combination total value of eight kinds, combination calculation of $15^8$, which is about 2560 millions, must be carried out. Even when a high-speed CPU is used, calculation time that is as long as several ten seconds to several hundreds seconds is needed, which is not suitable for practical use.

The present invention has been made to solve the above described problems, and an object of the present invention is to provide a mixing-weighing combination weigher that is capable of achieving high combination precision without increasing the number of hoppers of a specific kind (the above described N-th kind) that participate in combination unlike a mixing-weighing combination weigher using a sequential compensation method or a collective compensation method, and is of capable of performing an all-kind combination process in a short calculation time even through the number of kinds is large.

Means for Solving the Problems

In order to achieve the above described object, a mixing-weighing combination weigher of the present invention comprises a plurality of kind-based groups each of which is made up of a plurality of combination hoppers fed with objects to be weighed, the kind-based groups being fed with different kinds of objects to be weighed; and a control means; wherein the control means is configured to carry out: a kind-based combination process in which combination calculation is performed based on weight values of the objects to be weighed fed into the combination hoppers to find combination weight values for each of the kind-based groups, and combination weight values of a first selection number predetermined for each kind are selected from the combination weight values based on a predetermined kind-based combination selection condition; an all-kind combination process in which combination calculation is performed in such a manner that one combination weight value is selected for each kind from the combination weight values selected in the kind-based combination process, and the selected combination weight values are combined to find all-kind combination total values that are totals of combination weight values for all kinds, one all-kind combination total value is selected from the all-kind combination total values found in the combination calculation based on a predetermined all-kind combination selection condition, and combinations of the combination hoppers corresponding to the combination weight values combined to form the selected all-kind combination total value are respectively determined as kind-based discharge combinations; and a discharge process for discharging the objects to be weighed from the combination hoppers making up of the kind-based discharge combinations determined in the all-kind combination process.

In accordance with this configuration, in the all-kind combination process, since the combination weight values of the first selection number predetermined for each kind are selected and used as the combination weight values for the combination calculation, the number of combinations in the all-kind combination process does not increase, and calculation time of combination does not increase, by setting the first selection number to smaller even when the number of kinds (the number of groups of the kind-based groups) is large. Also, since the number of combinations increases as the number of kinds increases even through the first small number is set small, it becomes possible to achieve high combination precision in total of all kinds. Therefore, by deciding the first selection number of each kind according to the number of kinds, the number of combinations in the all-kind combination process can be determined appropriately, and calculation time of combination and combination precision can be kept appropriately. Furthermore, it is not necessary to increase the number of hoppers that accommodate the objects to be weighed of a specific kind for the purpose of achieving high combination precision in the total of all kinds unlike the conventional mixing-weighing combination weigher using the sequential compensation method or the collective compensation method, and the size of the combination weigher does not increase.

It is preferable that the kind-based combination selection condition in the kind-based combination process may be to preferentially select the combination weight values in which absolute values of differences with a kind-based target weight value determined for each kind are smaller. This makes it possible to improve combination precision in each kind.

It is preferable that in the kind-based combination process, the kind-based combination selection condition may be that the selected combination weight values fall within an allowable kind-based range predetermined for each kind, and the combination weight values within the allowable kind-based range are selected irrespective of the first selection number when a total number of the combination weight values within the allowable kind-based range is smaller than the first selection number. Thus, by selecting the combination weight values that fall within the allowable kind-based range, combination precision for each kind can be improved.

It is preferable that the first selection number for each kind may be predetermined in such a manner that, when the combination weight values of the first selection number are selected for respective of the kind-based groups in the kind-based combination process, the number of the all-kind combination total values found in combination calculation in the all-kind combination process is not larger than a number determined based on an allowable time of a time taken for the combination calculation in the all-kind combination process. Thus, by determining the first selection number, the combination calculation in the all-kind combination process can be completed within an allowable time.

The first selection number may be equal for all kinds. In cases where desired combination precision is substantially equal for the respective kinds, the first selection number can be easily determined by setting the first number equal for all kinds.

In this case, it is preferable that when a target time of a time taken for combination calculation in the all-kind combination process is T, a time taken for calculation of one set of combination in the combination calculation in the all-kind combination process is t, and the number of the kind-based groups is K, the first selection number is set to a predetermined value that is not larger than an integer value obtained by rounding a first decimal place of a value represented by $(T/t)^{1/K}$. Thus, by determining the first selection number, combination calculation in the all-kind combination process can be completed within almost target time T.

It is preferable that the kind-based combination selection condition in the kind-based combination process may be to select the combination weight values of a second selection number predetermined for each kind from the combination weight values that are not smaller than a kind-based target weight value predetermined for each kind, by giving priority to the combination weight values in which absolute values of differences with the kind-based target weight value are smaller, and to select the combination weight values of a third selection number predetermined for each kind from the combination weight values that are smaller than the kind-based target weight value, by giving priority to the combination weight values in which absolute value of differences with the kind-based target weight value are smaller, and a sum of the second selection number and the third selection number may be equal to the first selection number. Thus, in cases where the combination weight values are selected for each kind, by selecting the combination weight values in which absolute values of differences with the kind-based target weight value are smaller from the combination weight values that are not smaller than the kind-based target weight value, and by selecting the combination weight values in which absolute values of differences with the kind-based target weight value are smaller from the combination weight values that are smaller than the kind-based target weight value, it becomes possible to improve combination precision for each kind, and to improve combination precision in the all-kind combination process.

In this case, it is preferable that in the kind-based combination process, the kind-based combination selection condition may be that the selected combination weight values fall within an allowable kind-based range predetermined for each kind, wherein when the number of the combination weight values that fall within the allowable kind-based range and are not smaller than the kind-based target weight value is smaller than the second selection number, the combination weight values that fall within the allowable kind-based range and are not smaller than the kind-based target weight value may be selected irrespective of the second selection number, and wherein when the number of the combination weight values that fall within the allowable kind-based range and are smaller than the kind-based target weight value is smaller than the third selection number, the combination weight values that fall within the allowable kind-based range and are smaller than the kind-based target weight value may be selected irrespective of the third selection number. Thus, by selecting the combination weight values that fall within the allowable kind-based range, combination precision for each kind can be improved.

It is preferable that the kind-based combination selection condition in the kind-based combination process may be to select the combination weight values of a second selection number predetermined for each kind from the combination weight values that are larger than a kind-based target weight value predetermined for each kind, by giving priority to the combination weight values in which absolute values of differences with the kind-based target weight value are smaller, and to select the combination weight values of a third selection number predetermined for each kind from the combination weight values that are not larger than the kind-based target weight value, by giving priority to the combination weight values in which absolute values of differences with the kind-based target weight value are smaller, and a sum of the second selection number and the third selection number may be equal to the first selection number. Thus, in cases where the combination weight values are selected for each kind, by selecting the combination weight values in which absolute values of differences with the kind-based target weight value are smaller from the combination weight values that are larger than the kind-based target weight value and by selecting the combination weight values in which absolute values of differences with the kind-based target weight value are smaller from the combination weight values that are not larger than the kind-based combination weight, combination precision for each kind can be improved, and combination precision in the all-kind-based combination process can be improved.

In this case, it is preferable that in the kind-based combination process, the kind-based combination selection condition may be that the selected combination weight values fall within an allowable kind-based range predetermined for each kind, wherein when the number of the combination weight values that fall within the allowable kind-based range and are larger than the kind-based target weight value is smaller than the second selection number, the combination weight values that fall within the allowable kind-based range and are larger than the kind-based target weight value may be selected irrespective of the second selection number, and wherein when the number of the combination weight values that fall within the allowable kind-based range and are not larger than the kind-based target weight value is smaller than the third selection number, the combination weight values that fall within the allowable kind-based range and are not larger than the kind-based target weight value may be selected irrespective of the third selection number. Thus, by selecting the combination weight values that fall within the allowable kind-based range, combination precision for each kind can be improved.

The second selection number predetermined for each kind and the third selection number predetermined for each kind may be equal to each other and for all kinds. In cases where desired combination precision is substantially equal for the respective kinds, the second selection number and the third selection number can be easily determined by setting these numbers equal.

It is preferable, when a target time of a time taken for combination calculation in the all-kind combination process is T, a time taken for calculation of one set of combination in the combination calculation in the all-kind combination process is t, and the number of groups of the kind-based groups is K, the second selection number and the third selection number may be each set to a predetermined value that is not larger than an integer obtained by rounding a first decimal place of a value represented by $(T/t)^{1/k} \times (1/2)$. Thus, by determining the second selection number and the third selection number, the combination calculation in the all-kind combination process can be completed within almost target time T.

Each allowable kind-based range may be not smaller than a first value that is not larger than a corresponding kind-based target weight value and may be not larger than a second value larger than the corresponding kind-based target weight value. Thus, by setting a lower limit value (first value) and an upper limit value (second value) in each allowable kind-based range, high combination precision can be achieved for each kind.

Each allowable kind-based range may be not smaller than a first value that is not larger than a corresponding kind-based target weight value. In the mixing and weighing, in some cases, the lower limit value is important but the upper limit value is not so important for each kind. In those cases, it is not necessary to set the upper limit value.

For each kind, a first weight range that is not smaller than a first value that is not larger than a corresponding kind-based target weight value, and is not larger than a second value that is larger than the corresponding kind-based target weight value, and a second weight range that includes the first weight range and is wider than the first weight range may be as the allowable kind-based range; and the control means may be configured to perform the kind-based combination process using the first weight range as the allowable kind-based range; and when an all-kind combination total value satisfying the all-kind combination selection condition does not exist when the all-kind combination process is performed based on a result of the kind-based combination process, the kind-based combination process may be performed using the second weight range as the allowable kind-based range, and the all-kind combination process may be performed based on a result of the kind-based combination process.

In the mixing and weighing, the combination precision for each kind as well as the combination precision in the total of all kinds is important. There is a possibility that high combination precision cannot be obtained for each kind if the allowable kind-based range is set larger from the beginning. It is therefore desirable to perform the kind-based combination process using the first weight range which is a narrower range as the allowable kind-based range. However, if the allowable kind-based range is narrower, then the number of combination weight values selected for each kind decreases, leading to the problem that the all-kind combination total value that satisfies the all-kind combination selection condition cannot be obtained in the all-kind combination process (for example, combination of the combination weight values of each kind that fall within the allowable range cannot be obtained in the all-kind combination process). In that case, the kind-based combination process is performed using as the allowable kind-based range the second weight range which is the wider range, a possibility that a combination that falls within the allowable range is obtained in the all-kind combination process may increase.

The combination hoppers of the kind-based groups may form one or plural combination hopper lines in which the combination hoppers are arranged circularly, and the combination hoppers making up of the respective kind-based groups form one or plural circular-arc hopper lines in which the one or plural combination hopper lines are divided into plural parts. The mixing-weighing combination weigher may further comprise a collecting chute that is disposed below the combination hoppers of the kind-based groups to gather the objects to be weighed discharged from the combination hoppers and to discharge the objects to be weighed from an outlet provided at a lower part of collecting chute.

The kind-based groups may be divided into plural blocks. In each of the blocks, the combination hoppers of the kind-based groups may form one or plural combination hopper lines in which the combination hoppers within the blocks are arranged circularly, and the combination hoppers making up of the respective kind-based groups form one or plural circular-arc hopper lines in which the one or plural combination hopper lines are divided into plural parts. The mixing-weighing combination weigher hopper may further comprise a plurality of first collecting chutes that are disposed below the combination hoppers within the blocks so as to respectively correspond to the blocks, to gather the objects to be weighed discharged from the combination hoppers within corresponding blocks and to discharge the objects to be weighed from first outlets provided at lower parts of the first collecting chutes; and a second collecting chute that gathers the objects to be weighed discharged from the first outlets of the first collecting chutes and discharges the objects to be weighed from a second outlet provided at a lower part of the second collecting chute. For example, such a configuration may be used when the number of kinds is extremely large.

In this case, the control means may include a plurality of divided control means that respectively correspond to the blocks, obtain weight values of the objects to be weighed that have been fed into the combination hoppers in the corresponding blocks, and performs the discharge process for discharging the objects to be weighed from the combination hoppers making up of kind-based discharge combinations in the corresponding blocks; and one of the plurality of divided control means may be configured to obtain weight values of the objects to be weighed from the other divided control means and to perform the kind-based combination process and the all-kind combination process, and is configured to inform the other divided control means of the combination hoppers within the blocks corresponding to the other divided control means, of the combination hoppers making up of the kind-based discharge combinations determined in the all-kind combination process.

The control means may include a plurality of divided control means that respectively correspond to the blocks, obtain weight values of the objects to be weighed that have been fed into the combination hoppers within the corresponding blocks, and perform the discharge process for discharging the objects to be weighed from the combination hoppers making up of the kind-based discharge combinations in the corresponding blocks, and a calculation control means; and the calculation control means may be configured to obtain weight values of the objects to be weighed from the divided control means and to perform the kind-based combination process and the all-kind combination process, and may be configured to inform the divided control means of the combination hoppers within the blocks corresponding to the divided control means, of the combination hoppers making up of the kind-based discharge combinations determined in the all-kind combination process.

In the configuration including the plurality of divided control means, the divided control means may be configured to perform the discharge process simultaneously.

The number of combination hoppers in a kind-based group may be differed from the number of combination hoppers in another kind-based group. For example, for the kind that requires higher combination precision, the number of combination hoppers to be allocated to that kind-based group may be set to larger than the number of another kind-based groups.

The predetermined all-kind combination selection condition may be to select all-kind combination total values within an allowable range with respect to a predetermined target combination weight value.

The predetermined all-kind combination selection condition may be to select the all-kind combination total value that falls within an allowable range with respect to a predetermined target combination weight value and is smallest in an absolute value of a difference with the target combination weight value.

The predetermined all-kind combination selection condition may be to, when a series of processes including the kind-based combination process, the all-kind combination process and the discharge process are repeated predetermined number of times or more, extract as selection candidates, all-kind combination total values selected in the all-kind combination process in the series of processes performed predetermined continuous number of times and satisfying that an average of them is not smaller than a predetermined target combination weight value, and to select the all-kind combination total value that falls within an allowable range with respect to the target combination weight value and is smallest in an absolute value of a difference with the target combination weight value, from the all-kind combination total values extracted as the selection candidates.

Effects of the Invention

The present invention has the above described configuration, and a mixing-weighing combination weigher of the present invention is capable of achieving high combination precision in total of all kinds without increasing the number of hoppers of a specified kind that participate in combination unlike a mixing-weighing combination weigher using a sequential compensation method or a collective compensation method, and of capable of performing an all-kind combination process in a short time even though the number of kinds is large.

The above object, other objects, features, and advantages of the present invention will be apparent by the following detailed description of preferred embodiment of the inventions, with reference to the accompanying drawings.

Figure 1A:
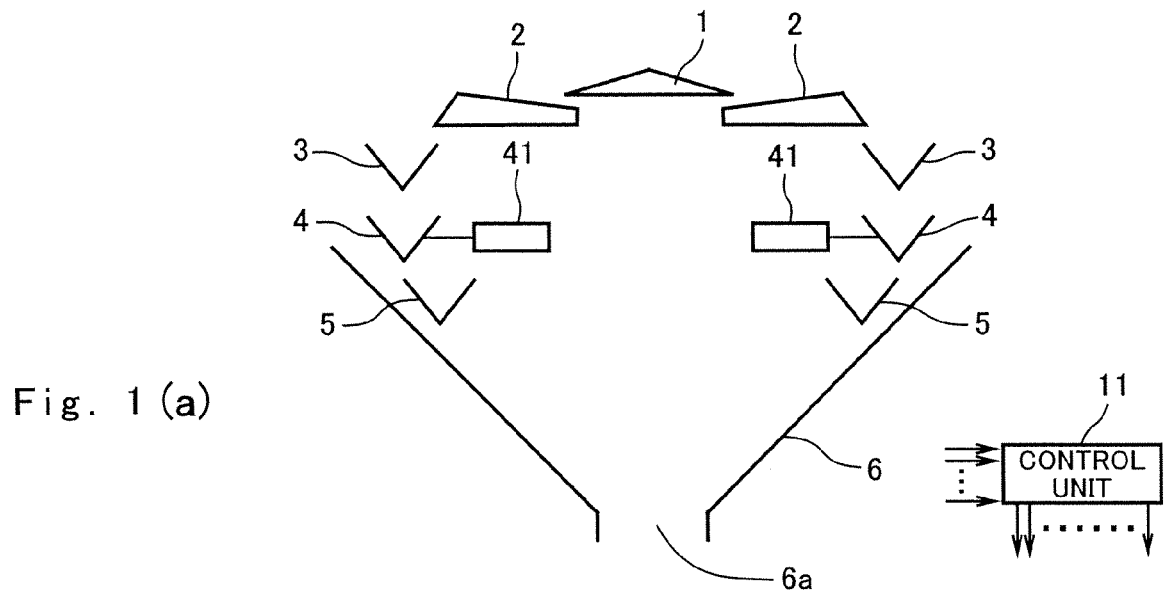
FIG. 1(a) is a schematic cross-sectional view of a mixing-weighing combination weigher according to a first embodiment of the present invention as viewed from laterally.

EXPLANATION OF REFERENCE NUMBERS 1. dispersion feeder
2. linear feeder
3. feeding hopper
4. weighing hopper
5. memory hopper
6. collecting chute
11, 31, 32, 33, 34. control unit
35. controller

BEST MODE FOR CARRYING THE INVENTION

Hereinafter, preferred embodiments of the present invention will be described with reference to the drawings.

Embodiment 1

Figure 1B:
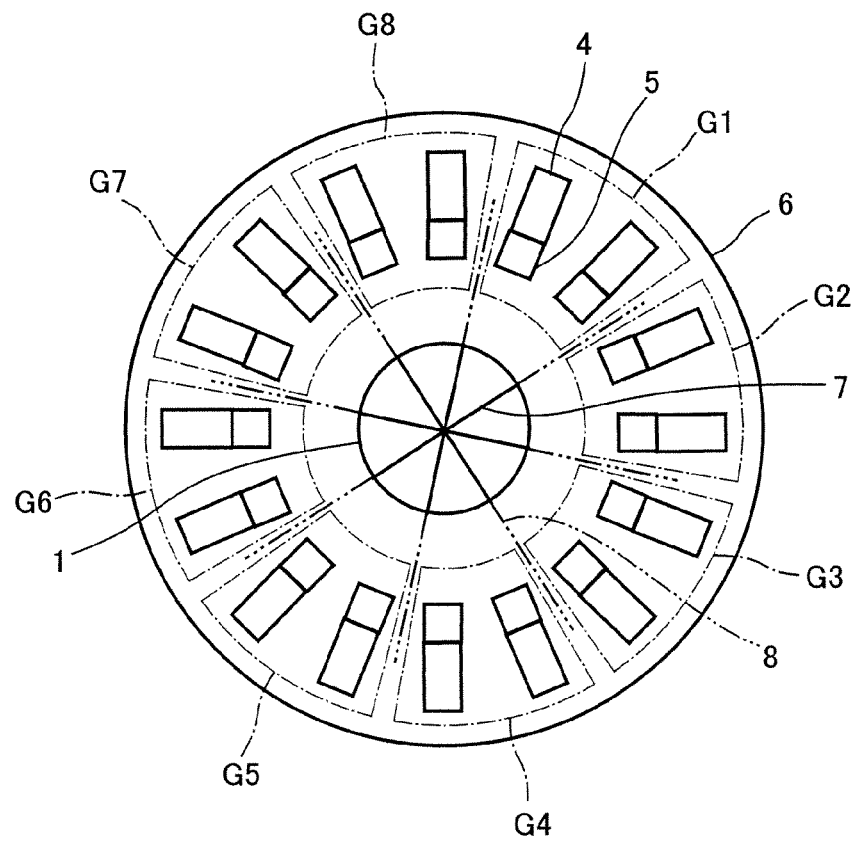
FIG. 1(b) is a schematic view of the mixing-weighing combination weigher according to the first embodiment of the present invention as viewed from above.

FIG. 1(a) is a schematic cross-sectional view of a mixing-weighing combination weigher according to a first embodiment of the present invention as viewed from laterally, and FIG. 1(b) is a schematic view of the mixing-weighing combination weigher according to the first embodiment of the present invention as viewed from above.

The mixing-weighing combination weigher according to the embodiment of the present invention is constructed in such a manner that a dispersion feeder 1 having a conical shape is mounted at the center of an upper part of the combination weigher to radially disperse objects to be weighed supplied from an external supplying device by vibration. Around the dispersion feeder 1, linear feeders 2 are provided to transfer the objects to be weighed sent from the dispersion feeder 1 into respective feeding hoppers 3 by vibration. A plurality of feeding hoppers 3, weighing hoppers 4, and memory hoppers 5 are disposed below the linear feeders 2 and are arranged circularly in such a manner that each feeding hopper 3, each weighing hopper 4, and each memory hopper 5 correspond to the associated one of the linear feeders 2. Each feeding hopper 3 receives the objects to be weighed which have been transferred from the linear feeder 2, and opens its gate to feed the objects to be weighed into the weighing hopper 4 located therebelow when the weighing hopper 4 becomes empty. Each weighing hopper 4 is attached with a weight sensor 41 such as a load cell, which measures the weight of the objects to be weighed inside the weighing hopper 4, and sends a measured value to a control unit 11. Each weighing hopper 4 is capable of selectively discharging the objects to be weighed to the memory hopper 5 located obliquely therebelow or to the collecting chute 6. When the memory hopper 5 becomes empty, the objects to be weighed are fed thereto from the weighing hopper 5. The collecting chute 6 is disposed below the weighing hopper 4 and the memory hopper 5, and gathers the objects to be weighed which have been discharged from the weighing hopper 4 and the memory hopper 5 to discharge the objects to be weighed from an outlet 6a provided at a lower part thereof.

In the embodiment, a combination weigher which mixes and weighs the objects to be weighed of, for example, eight kinds (A-H). The weighing hoppers 4 and the memory hoppers 5 which are arranged circularly are divided into a plurality of kind-based groups G1 to G8 in such a manner that adjacent two weighing hoppers 4 and two memory hoppers 5 located therebelow to respectively correspond to the weighing hoppers 4 make up of one kind-based group (group made up of hoppers which are to be used in kind-based combination calculation). The objects to be weighed of different kinds A to H are respectively supplied to the kind-based groups G1 to G8. To prevent mixing the objects to be weighed of different kinds, separating boards 7 are mounted on the dispersion feeder 1, and separating boards 8 are provided between linear feeders 2 corresponding to different groups. The external supplying device for supplying the objects to be weighed onto the dispersion feeder 1 is configured to supply the objects to be weighed of different 8 kinds to corresponding parts separated by the separating boards 7 on the dispersion feeder 1. The objects to be weighed of the kind A are supplied to the kind-based group G1 and the corresponding part (linear feeder 2 and feeding hopper 3). Likewise, the objects to be weighed of the kind B are supplied to the kind-based group G2 and the corresponding part, the objects to be weighed of the kind C are supplied to the kind-based group G3 and the corresponding part, the objects to be weighed of the kind D are supplied to the kind-based group G4 and the corresponding part, the objects to be weighed of the kind E are supplied to the kind-based group G5 and the corresponding part, the objects to be weighed of the kind F are supplied to the kind-based group G6 and the corresponding part, the objects to be weighed of the kind G are supplied to the kind-based group G7 and the corresponding part, and the objects to be weighed of the kind H are supplied to the kind-based group G8 and the corresponding part. In FIG. 1(b), the linear feeders 2, the feeding hoppers 3, and others are not illustrated.

The control unit 11 contains a CPU, memories such as a RAM and ROM, and others. In the memories, operation programs, set data of a number of operation parameters, measured value data, etc are stored. The control unit 11 is configured in such a manner that the CPU runs the operation programs stored in the memories to control the entire mixing-weighing combination weigher and to perform a combination process and other processes. In the combination process, a combination of hoppers (discharge hoppers) 4 and 5 which will discharge the objects to be weighed is found for each kind-based on the weights of the objects to be weighed inside the weighing hoppers 4 and inside the memory hoppers 5 which have been measured by the weight sensors 41. The weights of the objects to be weighed inside the memory hoppers 5 which are used in this combination process are the measured values obtained by the weight sensors 41 in the weighing hoppers 4 located thereabove. For example, a packaging machine is installed below the mixing-weighing combination weigher. The objects to be weighed are discharged from discharge hoppers 4 and 5 corresponding to the combination found in the combination process onto the collecting chute 6 and are fed into the packaging machine from the outlet 6a to be packaged.

Subsequently, an operation of the mixing-weighing combination weigher according to the embodiment will be described. The control unit 11 controls the operation of the entire mixing-weighing combination weigher.

The control unit 11 performs the combination process described later to determine a combination (kind-based discharge combination) of the hoppers 4 and 5 for each kind which will discharge the objects to be weighed. Receiving a feed command signal from the packaging machine, for example, the control unit 11 simultaneously opens and closes the gates of the hoppers 4 and 5 of each kind-based discharge combination. The objects to be weighed are discharged from the hoppers 4 and 5 whose gates have been opened and closed, slide down on the collecting chute 6, and are fed into the packaging machine from the outlet 6a. To feed the objects to be weighed to the memory hopper 5 which has discharged the objects to be weighed from the corresponding weighing hopper 4 located thereabove, the control unit 11 opens and closes the gate of the corresponding weighing hopper 4. To feed the objects to be weighed to the weighing hopper 4 which has fed the objects to be weighed to the memory hopper 5 and to the weighing hopper 4 which has discharged the objects to be weighed onto the collecting chute 6, from the corresponding feeding hopper 3 located thereabove, the control unit 11 opens the gate of the corresponding feeding hopper 4, and performs next combination process after predetermined weigher stabilization time (output stabilization time of the weight sensor 41). By repeating a series of process in this manner, the objects to be weighed are sequentially fed into the packaging machine and are packaged. Also, to feed the objects to be weighed to the feeding hopper 3 which has fed the objects to be weighed to the weighing hopper 4, the control unit 11 controls the linear feeder 2 and the dispersion feeder 1.

Subsequently, a detail of the combination process performed by the control unit 11 will be described. The combination process is composed of a kind-based combination process for each kind and an all-kind combination process for all kinds. Based on a result of the kind-based combination process, the all-kind combination process is carried out. A kind-based target weight value for each kind (kind-based target weight value) and an allowable range for that target weight value (allowable kind-based range) are predetermined for each kind, and a total target weight value of all kinds (target combination weight value) and an allowable range for that target weight value (allowable combination range) are predetermined. Regarding the allowable kind-based range, for example, a value smaller than the kind-based target weight value is set as a lower limit value, and a value larger than the kind-based target weight value is set as an upper limit value. Regarding the allowable combination range, for example, the target combination weight value is set as a lower limit value, and a value larger than the target combination weight value is set as an upper limit value. By way of example, a kind-based target weight value of each of the eight kinds A to H is 50 g, a lower limit value of the allowable kind-based range of each of the kinds A to H is 35 g that is equal to 70% of the kind-based target weight value, an upper limit value thereof is 85 g that is equal to 170% of the kind-based target weight value, the target combination weight value is 400 g that is equal to a total of the kind-based target weight values of all kinds. Also, a lower limit value of the allowable combination range is 400 g that is equal to the target combination weight value, and an upper limit value thereof is 420 g that is equal to 105% of the target combination weight value. As a matter of course, the kind-based target weight values and the allowable kind-based ranges are different from each other from the kind A to the kind H.

A method of the combination process performed by the control unit 11 in this embodiment is composed of two methods of a first method and a second method. The control unit 11 performs the combination process according to one of these methods.

Figure 2:
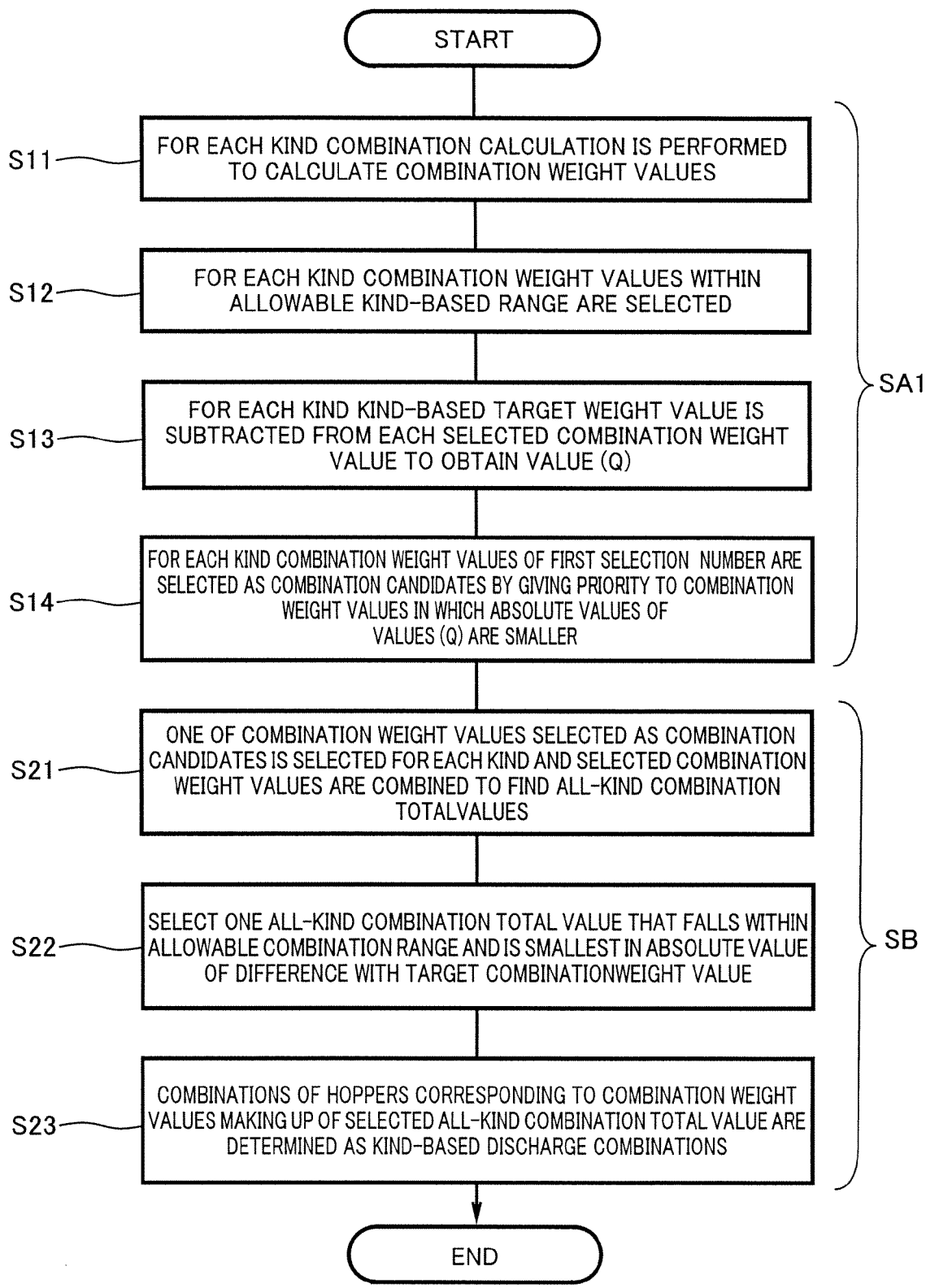
FIG. 2 is a flowchart of a combination process according to a first method in the embodiment of the present invention.

First of all, the combination process according to the first method will be described. FIG. 2 shows an example of the flowchart of the combination process according to the first method. In FIG. 2, a process SA1 in steps S11 to S14 is the kind-based combination process, and a process SB in steps S21 to S23 is the all-kind combination process.

In the kind-based combination process in the combination process, combination calculation is performed for each kind (in each of the kind-based groups G1 to G8) in such a manner that weight values (measured values obtained by the weight sensors 41) of the objects to be weighed which have been fed into the weighing hoppers 4 and into the memory hoppers 5 are combined to find combination weight values (step S11). For each kind, combination weight values within the allowable kind-based range are selected from the combination weight values obtained in the above combination calculation (step S12), and the kind-based target weight value is subtracted from the selected combination weight values (step S13). For each kind, by giving priority to the combination weight values in which absolute values of the values calculated in step S13 are smaller, the combination weight values of a first selection number predetermined for each kind are selected and determined as combination candidates (step S14).

In step S12 to S14, by giving priority to the combination weight values that fall within the allowable kind-based range and are smaller in absolute values (absolute values of values obtained by subtracting the kind-based target weight value from the combination weight values) of differences with the kind-based target weight value, the combination weight values of the first selection number are selected. It should be noted that in each kind, if the total number of the combination weight values within the allowable kind-based range is smaller than the first selection number, only combination weight values within the allowable kind-based range may be selected (in this case, in step S14, the combination weight values selected in step S12 are all selected).

Following the above, in the all-kind combination process, combination calculation is performed based on the combination weight values selected as the combination candidates in the kind-based combination process in such a manner that one combination weight value is selected for each kind and those selected combination weight values are combined to find all-kind combination total values which are the total of the combination weight values of all kinds (step S21). From the all-kind combination total values found in the combination calculation, one all-kind combination total value that falls within the allowable combination range and is smallest in absolute value of the difference with the target combination weight value is selected (step S22). Combination of the hoppers 4 and 5 corresponding to the combination weight values making up of the selected all-kind combination total value are determined as the kind-based discharge combinations (step S23).

Alternatively, the total allowable combination range of all kinds is set to a range which is not smaller than a lower limit value that is smaller than the target combination weight value (upper limit value is not set). In this case, step S22 is performed as follows. When a series of processes composed of the kind-based combination process and the all-kind combination process which are performed after a lapse of the weigher stabilization time, a discharge process from the hoppers making up of the kind-based discharge combinations, and a feed process for feeding the objects to be weighed to the hoppers which have gone through the discharge process is repeated predetermined number of times (e.g., 50 times), and all-kind combination total values are selected in the all-kind combination process in the series of processes performed predetermined continuous number of times (e.g., 50 times), the all-kind combination total values whose average satisfies not smaller than the target combination weight value are extracted as selection candidates from the all-kind combination total values that have been found in the combination calculation in step S21, and further, one all-kind combination total value that falls within the allowable combination range and is smallest in the absolute value of the difference with the target combination weight value (absolute value obtained by subtracting the target combination weight value from the all-kind combination total value) is selected from the all-kind combination total values extracted as the selection candidates. The allowable combination range is, as described above, not smaller than the lower limit value. As the lower limit value, a first determined value smaller than the target combination weight value and a second predetermined value smaller than the first predetermined value are set. Typically, one all-kind combination total value within the allowable combination range in which the first predetermined value is the lower limit value is selected. But, if the all-kind combination total value does not exist in the allowable combination range in which the first predetermined value is the lower limit value, one all-kind combination total value that falls within the allowable combination range and is closest to the target combination weight value may be selected, by using the allowable combination range in which the second predetermined value is the lower limit value once in the series of processes performed predetermined continuous number of times (e.g., 50 times).

As described above, kind-based discharge combination is determined for each kind in the combination process. When the control unit 11 performs the combination process according to the first method, the kind-based target weight value and allowable kind-based range of each kind, the total target combination weight value of all kinds and the total combination allowable range of all kinds, the first selection number of the combination weight values of each kind in the kind-based combination process are preset as operation parameters and are stored in the memory of the control unit 11. In addition, information required for the combination process, such as information as to which hoppers form each kind-based group, is prestored in the memory. Furthermore, information obtained in the combination process (information of combination weight values, information of all-kind combination total values, information as to which hoppers make up of the kind-based discharge combination) are stored in the memories.

In the kind-based combination process, four measured values indicating weights of the objects to be weighed of the two weighing hoppers 4 and two memory hoppers 5 of each kind-based group are used to form the combination. For example, a target feed amount for each weighing hopper 4 may be set to 50 to 60% of the kind-based target weight value so that the kind-based target weight value or the combination weight value closer to the kind-based target weight value is obtained by combining 1.7 to 2 (average number) measured values out of the four measured values.

The first selection number of the combination weight values for each kind in the kind-based combination process may be set to M (M: plural number) that is identical for all kinds. In this case, the selection number M may be set as follows. When target time of time taken for combination calculation in the all-kind combination process is T, time taken for calculation of one set of combination in the combination calculation in the all-kind combination process is t, and the number of all kinds (the number of groups of kind-based groups) is K, the number M is set to an integer P obtained by, for example, rounding a first decimal place of a value represented by $(T/t)^{1/k}$ or to a value smaller than the integer P. For example, when T=5 ms, t=80 ns, K=8, $$(T/t)^{1/k}=(5 \text{ ms}/80 \text{ ns})^{1/8}=3.976.4$$

In this case, the integer P is 4, and by setting the number M to 4, the combination calculation in the all-kind combination calculation completes in approximately 5 ms, and thus, an operation speed of the combination weigher is not substantially affected. In this case, the number of combinations in the all-kind combination process is $4^8$=65536, and preferable combination precision is obtained. Also, by setting the number M to 3, the combination calculation in the all-kind combination completes in less than approximately 5 ms. In this case, the number of combinations in the all-kind combination process is $3^8$=6561, and combination precision degrades as compared to the case where the number M is set to 4 but satisfactorily high combination precision is obtained. By setting the selection number M in the manner described above, combination calculation time can be recognized in advance and the operation speed of the combination weigher can be recognized in advance. The time taken for combination calculation in the kind-based combination process is not taken into account, because it is much shorter than the combination calculation time in the all-kind combination process. The number of combinations in each of the kind-based groups G1 to G8 is $(2^4-1)$=15. The number of combinations for 8 kinds is 120. When the time taken for calculation of one set of calculation is 80 ns, the combination calculation time in the kind-based combination process is 80 ns×120=9600 ns=0.096 ms that is much shorter than the combination calculation time in the all-kind combination process.

In the combination process according to the first method, the selection number of the combination weight values of an arbitrary kind may be set to one in the kind-based combination process. However, if the selection number is one for all kinds, the total combination of all kinds is uniquely determined, and therefore the all-kind combination process becomes impossible (or the all-kind combination process becomes meaningless). For this reason, it is necessary to set the selection number of the combination weight value for at least one kind to at least plural. As the selection number of the combination weight values of each kind increases, the number of combinations in the all-kind combination process increases, improving combination precision, but increasing the combination calculation time. Therefore, it is necessary to set the selection number of the combination weight values for each kind so that the operation speed will not be significantly reduced.

For example, when the allowable time of the time taken for the combination calculation in the all-kind combination process is TA, the time taken for one set of calculation in the combination calculation in the all-kind combination process is t, the number of all kinds is K, and the selection number of combination weight values of each kind in the kind-based combination process is M1, M2, ..., Mk, the combination calculation in the all-kind combination process can be completed within the allowable time TA by setting the selection number of each kind so that the value of M1×M2×...×Mk, i.e., a product of the selection number of each kind (maximum number of combination) becomes TA/t or smaller. Therefore, the selection number of each kind can be set based on allowable number of times (integer obtained by rounding down a first decimal place of the value of TA/t) of the combination calculation that is determined according to the allowable time TA of time taken for the combination calculation in the all-kind combination process. To be specific, the selection number of each kind may be set so that the number of all-kind combination total values found in the combination calculation in the all-kind combination process is set to not larger than allowable number of times (maximum combination number that allows the combination calculation within the allowable time TA) of the combination calculation that is preset according to the allowable time TA of time taken for the combination calculation in the all-kind combination process when the combination weight values of the selection number for the respective of all kind-based groups are selected in the kind-based combination process. By setting the number of all-kind combination total values to the value of the allowable number of times of the combination calculation, the combination calculation in the all-kind combination process can be carried out so as to achieve highest combination precision within the allowable time. The selection number of the combination weight values for each kind is set using the target time T of the time taken for the combination calculation in the all-kind combination process when the selection numbers are M that is constant for all kinds. Alternatively, using the allowable time TA (>T), the number M may be set to not larger than an integer obtained by rounding down a first decimal place of the value of (TA/t)1/K. For example, when TA=6 ms, t=80 ns, and K=8, $(TA/t)^{1/K}$=(6 ms/80 ns)$^{1/8}$=4.068 Therefore, the number M may be set to 4 or less. In order to improve combination precision, it is desirable to set the number M to 4.

Figure 3:
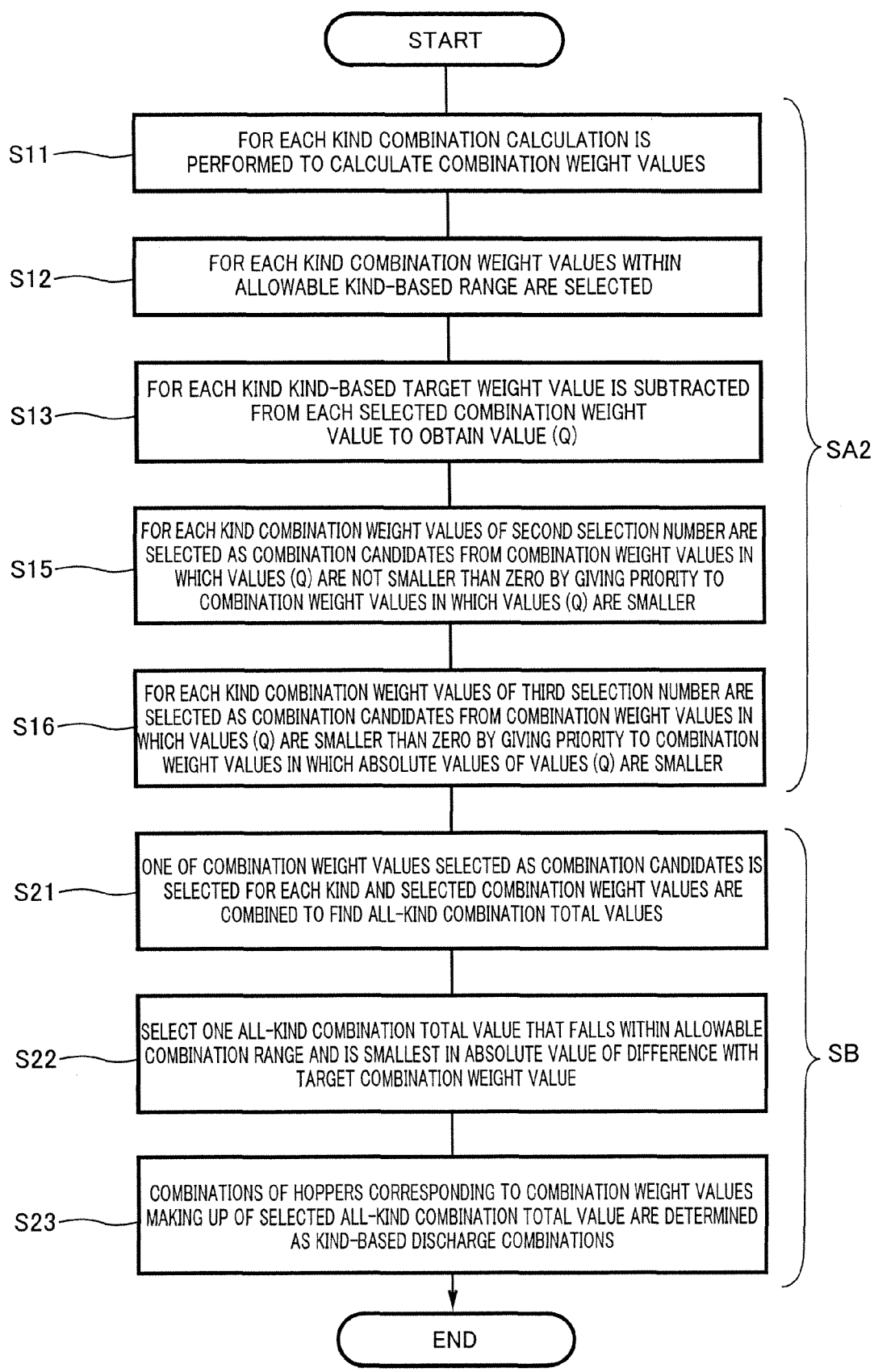
FIG. 3 is a flowchart of a combination process according to a second method in the embodiment of the present invention.

Subsequently, the combination process according to the second method will be described. FIG. 3 shows an example of a flowchart of the combination process according to the second method. In FIG. 3, a process SA2 in steps S11 to S16 is the kind-based combination process, and a process SB in steps S21 to S23 is the all-kind combination process.

In the kind-based combination process in this combination process, combination calculation is performed for each kind (for each of the kind-based groups G1 to G8) to find combination weight values obtained by combining weight values (measured values obtained by he weight sensors 41) of the objects to be weighed that have been fed into the weighing hoppers 4 and the memory hoppers 5 (step S11). For each kind, combination weight values within the allowable kind-based range are selected from the combination weight values found in the above combination calculation (step S12), and the kind-based target weight value is subtracted from the selected combination weight values (step S13). For each kind, combination weight values of second selection number predetermined for each kind are selected as combination candidates, from the values of not smaller than 0 obtained by calculation in step S13, by giving priority to smaller combination weight values (step S15). Furthermore, for each kind, combination weight values of third selection number predetermined for each kind are selected as combination candidates, from the combination weight values smaller than 0 obtained by calculation in step S13, by giving priority to combination weight values whose absolute values are smaller (step S16).

In the above described step S12 through step S16 (S12, S13, S15, and S16), the combination weight values of the second selection number predetermined for each kind are selected from the combination weight values that fall within the allowable kind-based range and are not smaller than the kind-based target weight value, among the combination weight values found in the combination calculation in step S11, by giving priority to the combination weight values in which absolute values of differences with the kind-based target weight value (absolute values of the values obtained by subtracting the kind-based target weight value from the combination weight values) are smaller. In addition, the combination weight values of the third selection number predetermined for each kind are selected from the combination weight values that fall within the allowable kind-based range and are smaller than the kind-based target weight value, among the combination weight values found in the combination calculation in step S11, by giving priority to the combination weight values in which absolute values of differences with the kind-based target weight value (absolute values of the values obtained by subtracting the kind-based target weight value from the combination weight values) are smaller. Thus, for each kind, combination weight values of (the second selection number plus the third selection number) are selected, and therefore, at least two combination weight values are selected for each kind. It should be noted that, if the total number of combination weight values that fall within the allowable kind-based range and are not smaller than the kind-based target weight value is smaller than the second selection number, in each kind, then only the combination weight values that fall within the allowable kind-based range and are not smaller than the kind-based target weight value may be selected (In this case, the combination weight values that are obtained by calculation in step S13 and are not smaller than 0 are all selected in step S15). Likewise, in each kind, if the total number of combination weight values that fall within the allowable kind-based range and are smaller than the kind-based target weight value is smaller than the third selection number, then only the combination weight values that fall within the allowable kind-based range and are smaller than the kind-based target weight value may be selected (In this case, the combination weight values that are obtained by calculation in step S13 and are smaller than 0 are all selected in step S16).

Whereas in the above configuration, the combination weight values of the second selection number are selected from the combination weight values that fall within the allowable kind-based range and are not smaller than the kind-based target weight value, and the combination weight values of the third selection number are selected from the combination weight values that fall within the allowable kind-based range and are smaller than the kind-based target weight value, the combination weight values of the second selection number may be selected from the combination weight values that fall within the allowable kind-based range and are larger than the kind-based target weight value, and the combination weight values of the third selection number may be selected from the combination weight values that fall within the allowable kind-based range and are not larger than the kind-based target weight value.

Since the all-kind combination process (step S21 to S23) in the combination process according to the second method are identical to the all-kind combination process in the combination process according to the first method, it will not be further described.

Through the above described combination process, the kind-based discharge combination for each kind is found. In a case where the control unit 11 performs the combination process according to the second method, the kind-based target weight value and the allowable kind-based range of each kind, total target combination value and total combination allowable range of all kinds, the second selection number and the third selection number of combination weight values of each kind in the kind-based combination process are set as the operation parameters and are stored in the memory within the control unit 11. In addition, information required for the combination process, such as information as to which hoppers form each kind-based group, are prestored in the memory. Furthermore, information obtained in the combination process (information of combination weight values, information of all-kind combination total value, information as to which hoppers make up of the kind-based discharge combination) are stored in the memory.

In the kind-based combination process, as in the case using the first method, four measured values indicating the weights of the objects to be weighed inside the two weighing hoppers 4 and the two memory hoppers 5 in the kind-based group are used for each kind to form the combination. For example, a target feed amount for each weighing hopper 4 may be set to 50 to 60% of the kind-based target weight value so that the kind-based target weight value or the combination weight value closer to the kind-based target weight value is obtained by combining 1.7 to 2 (average) measured values out of four measured values.

Moreover, the second selection number and the third selection number of the combination weight values for each kind in the kind-based-combination process may be set equal, and the second selection number and the third selection number of the combination weight values for all kinds may be set equal, m. In this case, the number m that is the second selection number and the third selection number may be set as follows. When the target time of the time taken for the combination calculation in the all-kind combination process is T, the time taken for the calculation of one set of combination in the combination calculation in the all-kind combination process is t, and the number of all kinds is K, the number m may be set to an integer p obtained by rounding a first decimal place of the value represented by $(T/t)^{1/K} \times (1/2)$ or to a value smaller than the integer p. For example, when T=5 ms, t=80 ns, and K=8, $$(T/t)^{1/K} \times (1/2) = (5 \text{ ms}/80 \text{ ns})^{1/8} \times (1/2) = 1.988.2.$$

In this case, the integer p is 2, and by setting the number m to 2, the combination calculation in the all-kind combination process is completed in about 5 ms, and the operation speed of the combination weigher is not substantially affected. The number of combinations in the all-kind combination process in this case is $(2 \times 2)^8 = 65536$, and preferable combination precision is obtained. In this case, when the number m is set to 1, the number of combinations in the all-kind combination process is $(1 \times 2)^8 = 256$, and combination precision significantly degrades as compared to the case where the number m is 2. Therefore, it is desirable to set the number m to 2. By setting the second selection number m and the third selection number m in the manner described above, combination calculation time can be recognized in advance, and the operation speed of the combination weigher can be recognized in advance. Although the time taken for the combination calculation in the kind-based combination process is not taken into account, it is much shorter than the time taken for the combination calculation in the all-kind combination process.

When the number m is set using the allowable time TA (>T) instead of the target time T of the time taken for the combination calculation in the all-kind combination process, it may be set to the value that is not larger than the integer obtained by rounding down a first decimal place of the value represented by $(TA/t)^{1/K} \times (1/2)$. For example, when TA=6 ms, t=80 ns, and K=8, $(TA/t) = (6 \text{ ms}/80 \text{ ns})^{1/8} \times (1/2) = 2.034$. Therefore, the number m may be set to 2 or smaller. In order to improve combination precision, it is desirable to set the number m to 2.

As should be appreciated from the above, in accordance with this embodiment, since in the all-kind combination process, the combination weight values of the selection number (first selection number, or second selection number, and third selection number) predetermined for each kind are selected as combination weight values (combination candidates) to be used in the combination calculation, an increase in the number of combinations in the all-kind combination process and an increase in the calculation time of the combination are prevented by setting the selection number to smaller even when the number of kinds is large. The number of combinations becomes large if the number of kinds is large, regardless of the smaller selection number, thereby enabling high total combination precision for all kinds. So, by setting the selection number of the combination candidates of each kind depending on the number of kinds, the number of combinations in the all-kind combination process can be determined appropriately, maintaining the calculation time of combination and combination precision at proper levels. Unlike the conventional mixing-weighing combination weigher using the sequential compensation method or the collective compensation method, it is not necessary to increase the number of hoppers which accommodate the objects to be weighed of a specified kind in order to make total combination precision for all kinds higher. This makes it possible to suppress an increase in the size of the combination weigher. In the past, it was not practical to apply the combination weigher including 16 weighing hoppers and 16 memory hoppers to the combination weigher for mixing and weighing many, for example, 8 kinds of objects to be weighed. However, in accordance with this embodiment, the combination weigher including 16 weighing hoppers and 16 memory hoppers can be suitably practiced as the combination weigher for mixing and weighing 8 kinds of objects to be weighed.

In this embodiment, the allowable kind-based range for each kind is the allowable range with respect to the kind-based target weight value. By setting the lower limit value (value smaller than the kind-based target weight value) and the upper limit value (value larger than the kind-based target weight value) as the allowable range, high combination precision is obtained for each kind. In the mixing and weighing, in some cases, the lower limit value is important but the upper limit value is not so important for each kind. In that case, it is not necessary to set the upper limit value.

As the allowable kind-based range for each kind, the first weight range that is not smaller than the first value that is not larger than the kind-based target weight value and is not larger than a second value larger than the kind-based target weight value, and a second weight range that includes the first weight range and is wider than the first weight range are predetermined. First, the kind-based combination process is performed using the first weight range as the allowable kind-based range. The all-kind combination process is performed based on a result of the kind-based combination process. As a result, if there does not exist a combination whose total combination weight value falls within the allowable range, the kind-based combination process may be performed using the second weight range as the allowable kind-based range, and the all-kind combination process may be performed based on a result of the kind-based combination process. In the mixing and weighing, the combination precision for each kind as well as the combination kind for all kinds is important. It may happen that high combination precision cannot be obtained for each kind if the allowable kind-based range is set larger from the beginning. Therefore, it is desirable to perform the kind-based combination process using the first weight range which is a narrower range, as the allowable kind-based range. Nonetheless, if the allowable kind-based range is narrower, the number of combination weight values selected for each kind decreases, and as a result, combination within the allowable combination range cannot be obtained in the all-kind combination process. In that case, by performing the kind-based combination process using the second weight range which is a wider range as the allowable kind-based range, combination within the allowable combination range can be probably obtained in the all-kind combination process.

The number of hoppers (number of measured values that participate in combination) making up of the kind-based groups for which the combination calculation is to be performed may be set different from each other. For example, for the kind that requires higher combination precision, the number of hoppers allocated to that kind-based group may be set larger than those allocated to the other kind-based groups.

If the combination precision for each kind need not be particularly high, then the combination weight values of the selection number may be always selected by giving priority to the combination weight values in which absolute values of differences with the kind-based target weight value are smaller, without setting the allowable kind-based range.

Alternatively, if the combination precision for each kind need not be particularly high, the combination weight values of the selection number that fall within the allowable kind-based range may be selected at random instead of selecting the combination weight values by giving priority to the combination weight values in which absolute values of differences with the kind-based target weight value are smaller.

Embodiment 2

Figure 4:
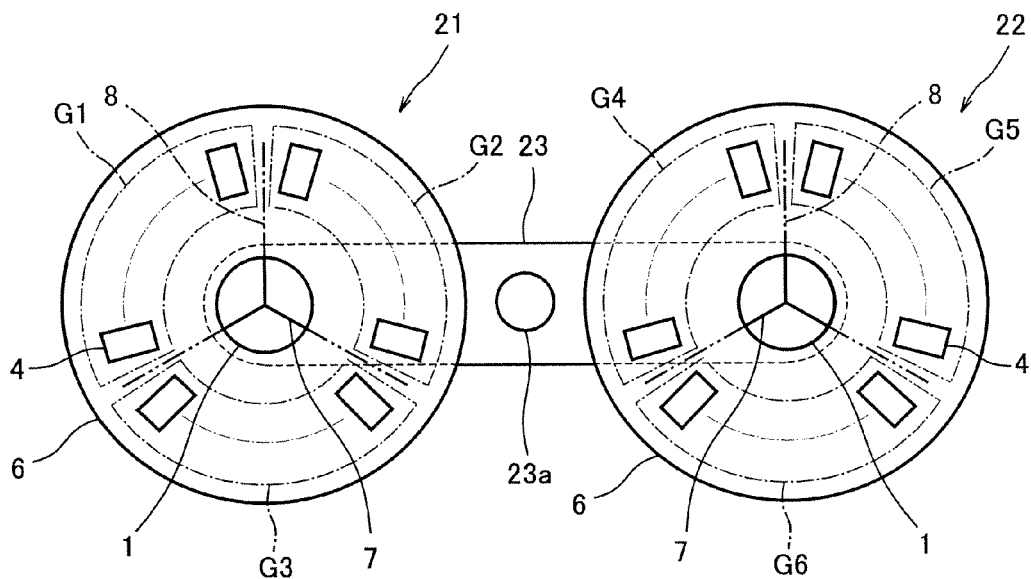
FIG. 4(a) is a schematic view of a mixing-weighing combination weigher according to a second embodiment of the present invention as viewed from above.
FIG. 4(b) is a schematic cross-sectional view of the mixing-weighing combination weigher according to the second embodiment of the present invention as viewed from laterally.
Figure 4:
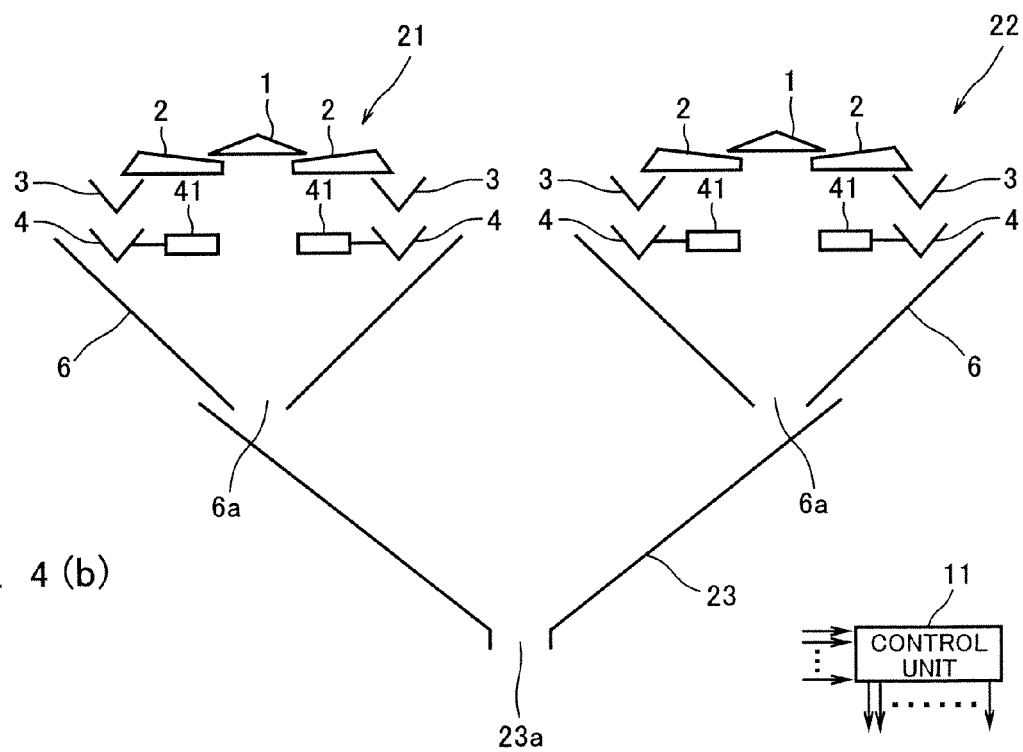

FIG. 4(a) is a schematic view of a mixing-weighing combination weigher according to a second embodiment of the present invention as viewed from above, and FIG. 4(b) is a schematic view of the mixing-weighing combination weigher according to the second embodiment of the present invention as viewed from laterally.

In this embodiment, the combination weigher comprises a plurality of combination weigher units 21 and 22, and a lower chute (second collecting chute) 23 that is disposed below the combination weigher units 21 and 22. A hard configuration of each of the combination weigher units 21 and 22 is basically identical to that of the mixing-weighing combination weigher of FIG. 1 except that each of the combination weigher units 21 and 22 does not include the memory hopper 5 (FIG. 1) and is adapted to 3 kinds of objects to be weighed, whereas the mixing-weighing combination weigher of FIG. 1 is adapted to 8 kinds of objects to be weighed, although these are shown in a simplified manner in FIG. 4(a). In addition, because of the absence of the memory hopper 5, each weighing hopper 4 may be configured to discharge the objects to be weighed only onto the collecting chute 6. The lower chute 23 gathers the objects to be weighed discharged from outlets 6a of the collecting chutes 6 of the combination weigher units 21 and 22 and discharge the objects to be weighed from an outlet 23a provided at a bottom portion thereof. A packaging machine is installed below the lower chute 23 and the objects to be weighed discharged from the lower chute 23 are fed into the packaging machine and packaged.

In the combination weigher unit 21, the weighing hoppers 4 arranged circularly are configured in such a manner that for example, five weighing hoppers 4 arranged continuously make up of one kind-based group, and fifteen weighing hoppers 4 in total are divided into three kind-based groups G1 to G3. In the same manner, in the combination weigher unit 22, the weighing hoppers 4 arranged circularly are configured in such a manner that for example, five weighing hoppers 4 arranged continuously make up of one kind-based group, and fifteen weighing hoppers 4 in total are divided into three kind-based groups G4 to G6. To the kind-based groups G1 to G6 of the two combination weigher units 21 and 22, different kinds of objects to be weighed are supplied. To prevent mixing of the different kinds of objects to be weighed, separating boards 7 are provided above dispersion feeders 1 of the combination weigher units 21 and 22, and separating boards 8 are provided between dispersion feeders 2 corresponding to different groups. An external supplying apparatus (not shown) for supplying the objects to be weighed onto the respective dispersion feeders 1 is capable of supplying different kinds of objects to be weighed to corresponding parts defined by the separating boards 7 on the dispersion feeders 1. In FIG. 4(a), the liner feeders 2, the feeding hoppers 3, and others are not illustrated.

As in the first embodiment, the control unit 11 controls the operation of the entire mixing-weighing combination weigher including the combination weigher units 21 and 22 and performs the combination process and other processes. The control unit 11 performs the combination process to determine combinations (kind-based discharge combinations) of the weighing hoppers 4 that will discharge the objects to be weighed for the respective kind-based groups G1 to G6, and opens gates of the weighing hoppers 4 making up of the kind-based discharge combinations to discharge the objects to be weighed, receiving a feed command signal from, for example, the packaging machine. The objects to be weighed that have been discharged from the weighing hoppers 4 of the kind-based groups G1 to G3 in the combination weigher unit 21 and the objects to be weighed that have been discharged from the weighing hoppers 4 of the kind-based groups G4 to G6 in the combination weigher unit 22 slide down on the collecting chutes 6, are gathered on the lower chute 23, and are fed into the packaging machine from the outlets 6a. The control unit 11 opens and closes the gates of the feeding hoppers 3 located above the weighing hoppers 4 that have discharged the objects to be weighed to feed the objects to be weighed, and performs next combination process after a lapse of a predetermined weigher stabilization time (output stabilization time of weight sensors 41). By repeating the series of processes in this manner, the objects to be weighed are sequentially fed to the packaging machine and packaged. The control unit 11 controls the linear feeder 2 and the dispersion feeder 1 so that the objects to be weighed are fed to the feeding hoppers 3 that have fed the objects to be weighed to the weighing hoppers 4.

As in the first embodiment, the combination process in the second embodiment may employ the first method or the second method and can achieve the effects similar to those of the first embodiment are obtained.

The number of kind-based groups in the combination weigher units 21 and 22 may be differed from each other.

Also, the number of hoppers (number of measured values that will participate in combinations) making up of the respective kind-based groups may be differed from each other.

When the number of kinds of the objects to be weighed is larger than eight, for example, ten, each kind-based group made up of the hoppers for which kind-based combination calculation is to be performed may be made up of two weighing hoppers and two memory hoppers as in the first embodiment, and each of the combination weigher units 21 and 22 may have five kind-based groups. In this case, by using the combination weigher units 21 and 22 having compact configuration, the mixing-weighing combination weigher which is able to mix and weigh more kinds of objects to be weighed is achieved. Furthermore, the mixing-weighing combination weigher may include three or more combination units such as the combination weigher units 21 and 22.

Alternative Example

Figure 5:
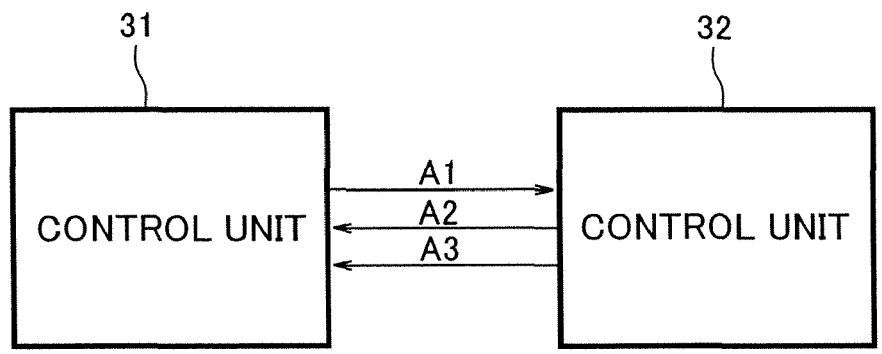
FIG. 5 is a block diagram showing a first alternative example of a control system according to the second embodiment of the present invention.
Figure 6:
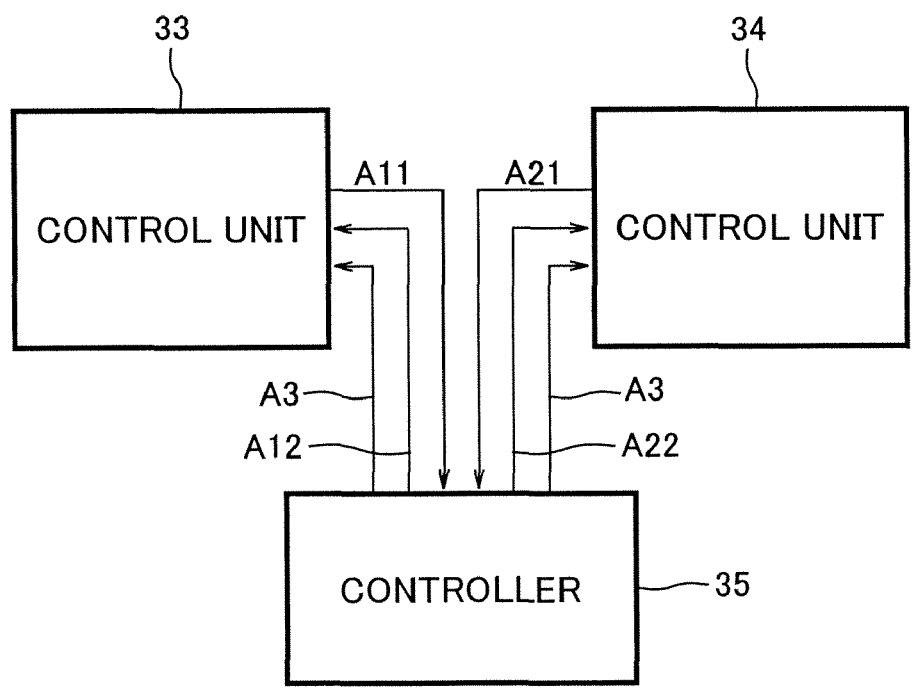
FIG. 6 is a block diagram showing a second alternative example of the control system according to the second embodiment of the present invention.

A first alternative example of a control system of the second embodiment is shown in FIG. 5 and a second alternative example is shown in FIG. 6.

In the first alternative example shown in FIG. 5, the control system includes a plurality of control units 31 and 32 instead of the control unit 11. That is, the control unit 11 is divided in function into a plurality of control units 31 and 32. Each of the control units 31 and 32 contains a CPU, and memories such as a RAM, and a ROM. Operation programs required for the respective control units, set data of the operation parameters, measured value data and others are stored in the memories of the control units 31 and 32.

The control unit 31 controls the operation of the combination weigher unit 21 and others in such a manner that the CPU built thereinto runs the operation programs stored in the memory. To be specific, the control unit 31 controls the vibration operation of the dispersion feeder 1 and of the linear feeders 2 in the combination weigher unit 21, gate opening and closing operations of the feeding hoppers 3 and of the weighing hoppers 4, and others. The control unit 31 receives as an input a signal from each weight sensor 41 in the combination weigher unit 21 and sends a signal A1 indicating measured values obtained by the weight sensors 41 to the control unit 32. The signal A1 contains measured values of the objects to be weighed of the weighing hoppers 4 in the combination weigher unit 21 and hopper numbers (identification numbers assigned to the weighing hoppers 4) corresponding to the measured values.

The control unit 32 controls the operation of the combination weigher unit 22 and others in such a manner that the CPU built thereinto runs the operation programs stored in the memory. To be specific, the control unit 31 controls the vibration operation of the dispersion feeder 1 and of the linear feeders 2 in the combination weigher unit 22, gate opening and closing operation of the feeding hoppers 3 and of the weighing hoppers 4, and others. The control unit 32 receives as an input a signal from each weight sensor 41 in the combination weigher unit 22, performs the kind-based combination process based on the measured values obtained by the respective weight sensors 41 in the combination weigher unit 22 and the sent measured values (signal A1) that have been obtained by the weight sensors 41 in the combination weigher unit 21, and then performs the all-kind combination process based on a result of the kind-based combination process, thereby finding combinations (kind-based discharge combinations) of hoppers that will discharge the objects to be weighed from the weighing hoppers 4 of the combination weigher units 21 and 22. The kind-based combination process and the all-kind combination process are similar to those of the first embodiment except that the hoppers subjected to the combination processes are the weighing hoppers 4, and will not be further described. The control unit 32 sends to the control unit 31 of the combination weigher unit 21a signal A2 indicating hopper numbers of the weighing hoppers 4 belonging to the combination weigher unit 22, among the weighing hoppers 4 making up of the kind-based discharge combinations that have been found in the kind-based combination process and the all-kind combination processes. Furthermore, receiving the feed command signal from the packaging machine, the control unit 32 sends to the control unit 31 a discharge timing signal A3 based on the feed command signal. In addition, the control unit 32 opens the gates of the weighing hoppers 4 belonging to the kind-based discharge combinations in the combination weigher unit 22 to discharge the objects to be weighed. Receiving the discharge timing signal A3, the control unit 31 opens the gates of the weighing hoppers 4 making up of the kind-based discharge combinations in the combination weigher unit 21 to discharge the objects to be weighed. As defined herein, the term "discharge timing signal A3" refers to a control signal for simultaneously opening the gates of the weighing hoppers 4 making up of the kind-based discharge combinations in both of the combination weigher units 21 and 22. The objects to be weighed that have been discharged simultaneously from the weighing hoppers 4 in the combination weigher units 21 and 22 slide down on the collecting chutes 6, are discharged from the outlets 6a onto the lower chute 23, slide down on the lower chute 23, and are fed from the outlet 23a into the packaging machine.

In the second alternative example shown in FIG. 6, the control system includes a plurality of control units 33 and 34 and a controller 35, instead of the control unit 11. The control unit 11 is divided in function into the plurality of control units 33 and 34 and the controller 35. Each of the plurality of control units 33 and 34 and the controller 35 contains a CPU, memories such as a RAM and ROM, and others. In the memories of the control units 33 and 34, and the controller 35, operation programs, set data of the operation parameters, measured value data, and others are stored.

The control unit 33 controls the operation of the combination weigher unit 21 and others in such a manner that the CPU built thereinto runs the operation programs stored in the memory. To be specific, the control unit 33 controls the vibration operation of the dispersion feeder 1 and of the linear feeder 2 in the combination weigher unit 21, gate opening and closing operations of the feeding hoppers 3 and of the weighing hoppers 4, and others. The control unit 33 receives as an input a signal from each weight sensor 41 in the combination weigher unit 21 and sends to the controller 35 a signal A11 indicating measured values obtained by the weight sensors 41. The signal A11 includes measured values of the objects to be weighed inside the weighing hoppers 4 in the combination weigher unit 21 and hopper numbers (identification numbers assigned to the weighing hoppers 4) corresponding to the measured values.

The control unit 34 controls the operation of the combination weigher unit 22 and others in such a manner that the CPU built thereinto runs the operation programs stored in the memory. To be specific, the control unit 34 controls the vibration operation of the dispersion feeder 1 and of the linear feeders 2 in the combination weigher unit 22, gate opening and closing operations of the feeding hoppers 3 and of the weighing hoppers 4, and others. The control unit 34 receives as an input a signal from each weight sensor 41 in the combination weigher unit 22 and sends to the controller 35 a signal A21 indicating measured values obtained by the respective weight sensors 41. The signal A21 includes measured values of the objects to be weighed of the weighing hoppers 4 in the combination weigher unit 22 and hopper numbers corresponding to the measured values.

The controller 35 performs the combination process and others in such a manner that the CPU built thereinto runs the operation program stored in the memory. To be specific, the controller 35 performs the kind-based combination process based on the measured values (signals A11 and A21) obtained by the weight sensors 41 in the combination weigher units 21 and 22 that have been sent from the control units 33 and 34, and performs the all-kind combination process based on a result of the kind-based combination process, thereby finding combinations (kind-based discharge combinations) of hoppers that will discharge the objects to be weighed from all the weighing hoppers 4 in the combination weigher units 21 and 22. The kind-based combination process and the all-kind combination process may be performed as in the first embodiment except that the hoppers subjected to these combination processes are only the weighing hoppers 4, and will not be further described. The controller 35 sends to the control unit 33 the signal A12 indicating hopper numbers of the weighing hoppers 4 belonging to the combination weigher unit 21 among the weighing hoppers 4 making up of the kind-based discharge combination found by the kind-based combination process and the all-kind combination process, and to the control unit 34 the signal A22 indicating hopper numbers of the weighing hoppers 4 belonging to the combination weigher unit 22 among the weighing hoppers 4 making up of the kind-based discharge combinations found by the kind-based combination process and the all-kind combination process. Furthermore, the controller 35 receives a feed command signal from the packaging machine, and sends a discharge timing signal A3 based on the feed command signal to the control unit 33 and to the control unit 34. Receiving the discharge timing signal A3, the control units 33 and 34 open the gates of the weighing hoppers 4 making up of the kind-based discharge combinations in the combination weigher units 21 and 22 to discharge the objects to be weighed. As defined herein, the term "discharge timing signal A3" refers to a control signal for simultaneously opening the gates of the weighing hoppers 4 making up of the kind-based discharge combinations in both of the combination weigher units 21 and 22. The objects to be weighed that have been discharged simultaneously from the weighing hoppers 4 in the combination weigher units 21 and 22 slide down on the associated collecting chutes 6, are discharged from the outlets 6a onto the lower chute 23, slide down on the lower chute 23, and are fed from the outlet 23a into the packaging machine.

Figure 7:
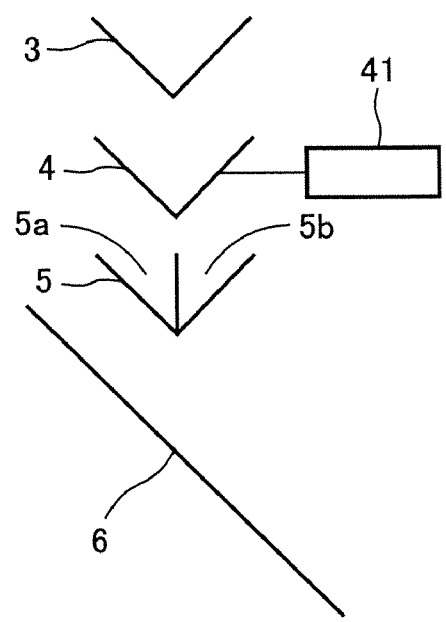
FIG. 7 is a schematic view showing another example of hoppers used in the embodiment of the present invention.

Whereas the hoppers which participate in the combinations are comprised of the weighing hoppers 4 and the memory hoppers 5 in the first embodiment, and consist of the weighing hoppers 4 in the second embodiment, they may be altered in various ways. For example, as shown in FIG. 7, the hoppers which participate in the combination may be comprised of the weighing hopper 4 and the memory hopper 5 having two accommodating chambers 5a and 5b. In this case, the weighing hopper 4 is configured to discharge the objects to be weighed selectively to the accommodating chamber 5a or to the accommodating chamber 5b of the memory hopper 5, and not to discharge the objects to be weighed onto the collecting chute 6. The two accommodating chambers 5a and 5b of each memory hopper 5 are each capable of discharging the objects to be weighed independently. The combination calculation is performed based on, for example, the weights of the objects to be weighed inside the accommodating chambers 5a and 5b of each memory hopper 5, and the accommodating chambers 5a and 5b participate in combination and the weighing hopper 4 does not. As the weight of the objects to be weighed inside the accommodating chamber 5a or 5b, the weight measured in the weighing hopper 4 located thereabove is used. It should be noted that the weighing hopper 4 can participate in the combination provided that the weighing hopper 4 and the accommodating chamber 5a or 5b of the corresponding memory hopper 5 are selected simultaneously. For example, when the weighing hopper 4 and the accommodating chamber 5a of the corresponding memory hopper 5 are selected simultaneously to select the discharge hoppers, the objects to be weighed are discharged from the weighing hoppers 4 onto the collecting chute 6 through the accommodating chamber 5a.

Figure 8:
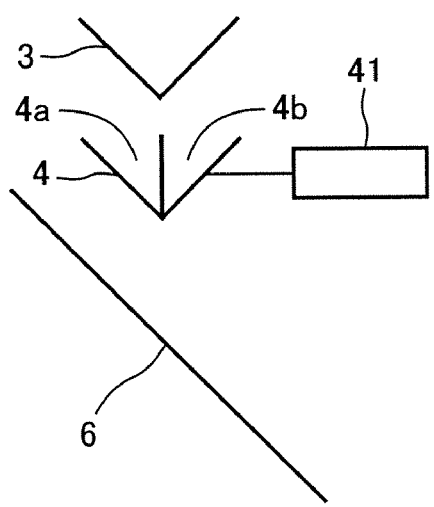
FIG. 8 is a schematic view showing another example of hoppers used in the embodiment of the present invention.

As shown in FIG. 8, each weighing hopper 4 may have two weighing chambers 4a and 4b. In this case, the feeding hopper 3 is configured to discharge the objects to be weighed selectively to the weighing chamber 4a or to the weighing chamber 4b of the weighing hopper 4, and the two weighing chambers 4a and 4b of the weighing hopper 4 are each configured to discharge the objects to be weighed independently. The combination calculation is performed based on the weights of the objects to be weighed inside the weighing chambers 4a and 4b of each weighing hopper 4, and the weighing chambers 4a and 4b participate in the combination. In the weighing hopper 4 having the two weighing chambers 4a and 4b, when the objects to be weighed are fed to one weighing chamber, for example, weighing chamber 4a, the weight of the objects to be weighed inside the weighing chamber 4a is measured by the weight sensor 41. When the objects to be weighed are fed to the other weighing chamber 4b, the weight sensor 41 measures a total weight of the objects to be weighed inside the two weighing chambers 4a and 4b. The control unit 11 (see FIGS. 1 and 4) subtracts the weight of the objects to be weighed inside the weighing chamber 4a from the total weight of the objects to be weighed inside the two weighing chambers 4a and 4b to obtain the weight of the objects to be weighed inside the weighing chamber 4b, and thus performs the combination calculation.

Figure 9:
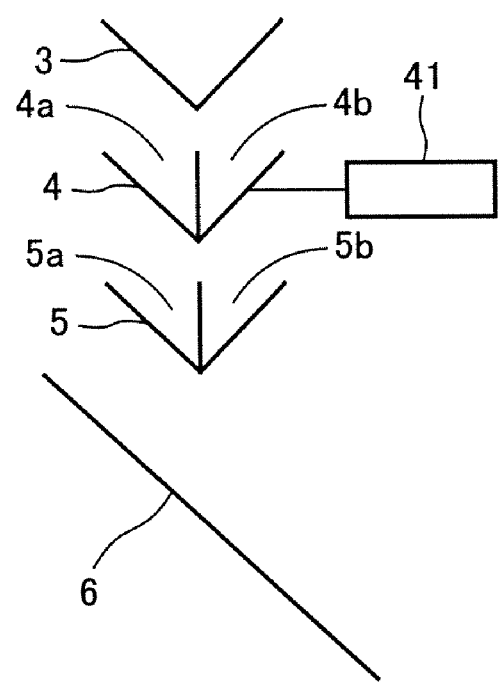
FIG. 9 is a schematic view showing another example of hoppers used in the embodiment of the present invention.

As shown in FIG. 9, each weighing hopper 4 may have two weighing chambers 4a and 4b, and the memory hopper 5 having the two accommodating chambers 5a and 5b respectively corresponding to the weighing chambers 4a and 4b of the weighing hopper 4 may be disposed below each weighing hopper 4. In this case, the feeding hopper 3 is configured to discharge the objects to be weighed selectively to the weighing chamber 4a or to the weighing chamber 4b. The objects to be weighed inside the weighing chamber 4a of the weighing hopper 4 are fed to the accommodating chamber 5a of the memory hopper 5, while the objects to be weighed inside the weighing chamber 4b of the weighing hopper 4 are fed to the accommodating chamber 5b of the memory hopper 5. The combination calculation is performed based on, for example, the weight of the objects to be weighed inside the accommodating chamber 5a or 5b of each memory hopper 5. The accommodating chambers 5a and 5b participate in the combination and the weighing hopper 4 does not. As the weight of the objects to be weighed inside the accommodating chamber 5a or 5b, the weight measured and calculated by and for the weighing chambers 4a and 4b located thereabove is used. It should be noted that the weighing chambers 4a and 4b of each weighing hopper 4 can participate in the combination provided that the weighing chambers 4a or 4b and the corresponding accommodating chambers 5a or 5b are selected simultaneously. For example, when the weighing chamber 4a and the corresponding accommodating chamber 5a are selected simultaneously as the discharge hoppers, the objects to be weighed inside the weighing chamber 4a are discharged onto the collecting chute 6 through the accommodating chamber 5a.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

The mixing-weighing combination weigher of the present invention is useful as a mixing-weighing combination weigher which mixes and weighs many kinds of objects to be weighed.

The invention claimed is:

1. A mixing-weighing combination weigher comprising:
a plurality of kind-based groups each of which is made up of a plurality of combination hoppers fed with objects to be weighed, the kind-based groups being fed with different kinds of objects to be weighed; and
a control means; wherein
the control means is configured to carry out:
a kind-based combination process in which combination calculation is performed based on weight values of the objects to be weighed fed into the combination hoppers to find combination weight values for each of the kind-based groups, and combination weight values of a first selection number predetermined for each kind are selected from the combination weight values based on a predetermined kind-based combination selection condition;
an all-kind combination process in which combination calculation is performed in such a manner that one combination weight value is selected for each kind from the combination weight values selected in the kind-based combination process, and the selected combination weight values are combined to find all-kind combination total values that are totals of combination weight values for all kinds, one all-kind combination total value is selected from the all-kind combination total values found in the combination calculation based on a predetermined all-kind combination selection condition, and combinations of the combination hoppers corresponding to the combination weight values combined to form the selected all-kind combination total value are respectively determined as kind-based discharge combinations;
a discharge process for discharging the objects to be weighed from the combination hoppers making up of the kind-based discharge combinations determined in the all-kind combination process;
wherein the first selection number is equal for all kinds; and
wherein when a target time of a time taken for combination calculation in the all-kind combination process is T, a time taken for calculation of one set of combination in the combination calculation in the all-kind combination process is t, and the number of the kind-based groups is K, the first selection number is set to a predetermined value that is not larger than an integer value obtained by rounding a first decimal place of a value represented by $(T/t)^{1/K}$.

2. The mixing-weighing combination weigher according to claim 1, wherein the kind-based combination selection condition in the kind-based combination process is to preferentially select the combination weight values in which absolute values of differences with a kind-based target weight value determined for each kind are smaller.

3. The mixing-weighing combination weigher according to claim 2, wherein in the kind-based combination process, the kind-based combination selection condition is that the selected combination weight values fall within an allowable kind-based range predetermined for each kind, and the combination weight values within the allowable kind-based range may be selected irrespective of the first selection number when a total number of the combination weight values within the allowable kind-based range is smaller than the first selection number.

4. The mixing-weighing combination weigher according to claim 1, wherein the first selection number for each kind is predetermined in such a manner that, when the combination weight values of the first selection number are selected for respective of the kind-based groups in the kind-based combination process, the number of the all-kind combination total values found in combination calculation in the all-kind combination process is not larger than a number determined based on an allowable time of a time taken for the combination calculation in the all-kind combination process.

5. A mixing-weighing combination weigher comprising:
a plurality of kind-based groups each of which is made up of a plurality of combination hoppers fed with objects to be weighed, the kind-based groups being fed with different kinds of objects to be weighed; and
a control means; wherein
the control means is configured to carry out:
a kind-based combination process in which combination calculation is performed based on weight values of the objects to be weighed fed into the combination hoppers to find combination weight values for each of the kind-based groups, and combination weight values of a first selection number predetermined for each kind are selected from the combination weight values based on a predetermined kind-based combination selection condition;
an all-kind combination process in which combination calculation is performed in such a manner that one combination weight value is selected for each kind from the combination weight values selected in the kind-based combination process, and the selected combination weight values are combined to find all-kind combination total values that are totals of combination weight values for all kinds, one all-kind combination total value is selected from the all-kind combination total values found in the combination calculation based on a predetermined all-kind combination selection condition, and combinations of the combination hoppers corresponding to the combination weight values combined to form the selected all-kind combination total value are respectively determined as kind-based discharge combinations;
a discharge process for discharging the objects to be weighed from the combination hoppers making up of the kind-based discharge combinations determined in the all-kind combination process; and
wherein the kind-based combination selection condition in the kind-based combination process is to select the combination weight values of a second selection number predetermined for each kind from the combination weight values that are not smaller than a kind-based target weight value predetermined for each kind, by giving priority to the combination weight values in which absolute values of differences with the kind-based target weight value are smaller, and to select the combination weight values of a third selection number predetermined for each kind from the combination weight values that are smaller than the kind-based target weight value, by giving priority to the combination weight values in which absolute value of differences with the kind-based target weight value are smaller, and a sum of the second selection number and the third selection number is equal to the first selection number.

6. The mixing-weighing combination weigher according to claim 5, wherein
in the kind-based combination process, the kind-based combination selection condition is that the selected combination weight values fall within an allowable kind-based range predetermined for each kind,
wherein when the number of the combination weight values that fall within the allowable kind-based range and are not smaller than the kind-based target weight value is smaller than the second selection number, the combination weight values that fall within the allowable kind-based range and are not smaller than the kind-based target weight value are selected irrespective of the second selection number,
and wherein when the number of the combination weight values that fall within the allowable kind-based range and are smaller than the kind-based target weight value is smaller than the third selection number, the combination weight values that fall within the allowable kind-based range and are smaller than the kind-based target weight value are selected irrespective of the third selection number.

7. A mixing-weighing combination weigher comprising:
a plurality of kind-based groups each of which is made up of a plurality of combination hoppers fed with objects to be weighed, the kind-based groups being fed with different kinds of objects to be weighed; and
a control means; wherein
the control means is configured to carry out:
a kind-based combination process in which combination calculation is performed based on weight values of the objects to be weighed fed into the combination hoppers to find combination weight values for each of the kind-based groups, and combination weight values of a first selection number predetermined for each kind are selected from the combination weight values based on a predetermined kind-based combination selection condition;
an all-kind combination process in which combination calculation is performed in such a manner that one combination weight value is selected for each kind from the combination weight values selected in the kind-based combination process, and the selected combination weight values are combined to find all-kind combination total values that are totals of combination weight values for all kinds, one all-kind combination total value is selected from the all-kind combination total values found in the combination calculation based on a predetermined all-kind combination selection condition, and combinations of the combination hoppers corresponding to the combination weight values combined to form the selected all-kind combination total value are respectively determined as kind-based discharge combinations;
a discharge process for discharging the objects to be weighed from the combination hoppers making up of the kind-based discharge combinations determined in the all-kind combination process; and
wherein the kind-based combination selection condition in the kind-based combination process is to select the combination weight values of a second selection number predetermined for each kind from the combination weight values that are larger than a kind-based target weight value predetermined for each kind, by giving priority to the combination weight values in which absolute values of differences with the kind-based target weight value are smaller, and to select the combination weight values of a third selection number predetermined for each kind from the combination weight values that are not larger than the kind-based target weight value, by giving priority to the combination weight values in which absolute value of differences with the kind-based target weight value are smaller, and a sum of the second selection number and the third selection number is equal to the first selection number.

8. The mixing-weighing combination weigher according to claim 7,
wherein in the kind-based combination process, the kind-based combination selection condition is that the selected combination weight values fall within an allowable kind-based range predetermined for each kind,
wherein when the number of the combination weight values that fall within the allowable kind-based range and are larger than the kind-based target weight value is smaller than the second selection number, the combination weight values that fall within the allowable kind-based range and are larger than the kind-based target weight value are selected irrespective of the second selection number,
and wherein when the number of the combination weight values that fall within the allowable kind-based range and are not larger than the kind-based target weight value is smaller than the third selection number, the combination weight values that fall within the allowable kind-based range and are not larger than the kind-based target weight value are selected irrespective of the third selection number.

9. The mixing-weighing combination weigher according to claim 5, wherein the second selection number predetermined for each kind and the third selection number predetermined for each kind are equal to each other and for all kinds.

10. The mixing-weighing combination weigher according to claim 9, wherein when a target time of a time taken for combination calculation in the all-kind combination process is T, a time taken for calculation of one set of combination in the combination calculation in the all-kind combination process is t, and the number of groups of the kind-based groups is K, the second selection number and the third selection number are each set to a predetermined value that is not larger than an integer obtained by rounding a first decimal place of a value represented by $(T/t)^{1/k} \times (1/2)$.

11. The mixing-weighing combination weigher according to claim 3, wherein each allowable kind-based range is not smaller than a first value that is not larger than a corresponding kind-based target weight value and is not larger than a second value larger than the corresponding kind-based target weight value.

12. The mixing-weighing combination weigher according to claim 3, wherein each allowable kind-based range is not smaller than a first value that is not larger than a corresponding kind-based target weight value.

13. The mixing-weighing combination weigher according to claim 3, wherein for each kind, a first weight range that is not smaller than a first value that is not larger than a corresponding kind-based target weight value, and is not larger than a second value that is larger than the corresponding kind-based target weight value, and a second weight range that includes the first weight range and is wider than the first weight range are set as the allowable kind-based range;

and wherein the control means is configured to perform the kind-based combination process using the first weight range as the allowable kind-based range; and when an all-kind combination total value satisfying the all-kind combination selection condition does not exist when the all-kind combination process is performed based on a result of the kind-based combination process, the kind-based combination process is performed using the second weight range as the allowable kind-based range, and the all-kind combination process is performed based on a result of the kind-based combination process.

14. The mixing-weighing combination weigher according to claim 1, wherein the combination hoppers of the kind-based groups form one or plural combination hopper lines in which the combination hoppers are arranged circularly, and the combination hoppers making up of the respective kind-based groups form one or plural circular-arc hopper lines in which the one or plural combination hopper lines are divided into plural parts; the mixing-weighing combination weigher further comprising:

a collecting chute that is disposed below the combination hoppers of the kind-based groups to gather the objects to be weighed discharged from the combination hoppers and to discharge the objects to be weighed from an outlet provided at a lower part of collecting chute.

15. The mixing-weighing combination weigher according to claim 1, wherein the kind-based groups are divided into plural blocks;

and wherein in each of the blocks, the combination hoppers of the kind-based groups within the blocks form one or plural combination hopper lines in which the combination hoppers are arranged circularly, and the combination hoppers making up of the respective kind-based groups form one or plural circular-arc hopper lines in the which one or plural combination hopper lines are divided into plural parts;

the mixing-weighing combination weigher hopper further comprising:

a plurality of first collecting chutes that are disposed below the combination hoppers within the blocks so as to respectively correspond to the blocks, to gather the objects to be weighed discharged from the combination hoppers within corresponding blocks and to discharge the objects to be weighed from first outlets provided at lower parts of the first collecting chutes; and a second collecting chute that gathers the objects to be weighed discharged from the first outlets of the first collecting chutes and discharges the objects to be weighed from a second outlet provided at a lower part of the second collecting chute.

16. The mixing-weighing combination weigher according to claim 15, wherein the control means includes a plurality of divided control means that respectively correspond to the blocks, obtain weight values of the objects to be weighed that have been fed into the combination hoppers in the corresponding blocks, and performs the discharge process for discharging the objects to be weighed from the combination hoppers making up of the kind-based discharge combinations in the corresponding blocks; and wherein one of the plurality of divided control means is configured to obtain weight values of the objects to be weighed from the other divided control means and to perform the kind-based combination process and the all-kind combination process, and is configured to inform the other divided control means of the combination hoppers within the blocks corresponding to the other divided control means, of the combination hoppers making up of the kind-based discharge combinations determined in the all-kind combination process.

17. The mixing-weighing combination weigher according to claim 15, wherein the control means includes a plurality of divided control means that respectively corresponds to the blocks, obtain weight values of the objects to be weighed that have been fed into the combination hoppers within the corresponding blocks, and perform the discharge process for discharging the objects to be weighed from the combination hoppers making up of the kind-based discharge combinations within the corresponding blocks, and a calculation control means; and wherein the calculation control means is configured to obtain weight values of the objects to be weighed from the divided control means and to perform the kind-based combination process and the all-kind combination process, and is configured to inform the divided control means of the combination hoppers within the blocks corresponding to the divided control means, of the combination hoppers making up of the kind-based discharge combinations determined in the all-kind combination process.

18. The mixing-weighing combination weigher according to claim 16, wherein the divided control means are configured to perform the discharge process simultaneously.

19. The mixing-weighing combination weigher according to claim 1, wherein the number of combination hoppers in a kind-based group is differed from the number of combination hoppers in another kind-based group.

20. The mixing-weighing combination weigher according to claim 1, wherein the predetermined all-kind combination selection condition is to select the all-kind combination total values within an allowable range with respect to a predetermined target combination weight value.

21. The mixing-weighing combination weigher according to claim 1, wherein the predetermined all-kind combination selection condition is to select the all-kind combination total value that falls within an allowable range with respect to a predetermined target combination weight value and is smallest in an absolute value of a difference with the target combination weight value.

22. The mixing-weighing combination weigher according to claim 1, wherein the predetermined all-kind combination selection condition is to, when a series of processes including the kind-based combination process, the all-kind combination process and the discharge process are repeated predetermined number of times or more, extract as selection candidates, all-kind combination total values selected in the all-kind combination process in the series of processes performed predetermined continuous number of times and satisfying that an average of them is not smaller than a predetermined target combination weight value, and to select the all-kind combination total value that falls within an allowable range with respect to the target combination weight value and is smallest in an absolute value of a difference with the target combination weight value, from the all-kind combination total values extracted as the selection candidates.

* * * * *